AUTOMATIC ALIGNMENT APPARATUS FOR DISC TILLERS

Filed June 21, 1966 2 Sheets-Sheet 1

INVENTOR.
LOYD E. HECKATHORN
HUGH B. CORDES
BY
ATTORNEY

AUTOMATIC ALIGNMENT APPARATUS FOR DISC TILLERS

Filed June 21, 1966 2 Sheets-Sheet 2

INVENTOR.
LOYD E. HECKATHORN
HUGH B. CORDES
BY
ATTORNEY

United States Patent Office 3,486,565

Patented Dec. 30, 1969

3,486,565
AUTOMATIC ALIGNMENT APPARATUS FOR DISC TILLERS

Loyd E. Heckathorn and Hugh B. Cordes, Garden Grove, Calif., assignors to Towner Manufacturing Company, Santa Ana, Calif., a corporation of California Filed June 21, 1966, Ser. No. 559,282
Int. Cl. A01b *21/08, 15/16, 23/06*
U.S. Cl. 172—572 4 Claims

ABSTRACT OF THE DISCLOSURE

The present invention relates generally to automatic alignment appartaus for disc tillers, and more particularly to means for maintaining several disc units in proper predetermined relation during operation.

With the advent of large scale farming operations, equipment has become larger and more powerful in order to cultivate or otherwise "work" a large plot of ground within a minimum amount of time. With respect to disc tillers, this has resulted in the use of ganged tillers which are composed of a plurality of disc units.

However, such ganged disc tillers, for optimum operation, must have the disc units in proper physical relation in order to do the work for which they are intended. Also, there must be sufficient flexibility between the various disc units to enable the tiller to generally conform to the contour of the ground in order to perform the proper discing operation.

To be more specific, in discing a given area, the tiller must have both a forward and a rearward section, and if each section is composed of several disc units, they must be flexible so as to easily comform to the general contour of the ground as well as obstacles therein. On the other hand, there is a desirable or optimum position of alingment of the various disc units to which they should return following flexing because of such ground contour or obstacles.

Heretofore, the various disc units have been hingedly connected together so as to provide the desired flexibility, but there has been no means whatever for urging such units into the optimum relationship. It has been realized for some period of time that means should be provided for this purpose, so that the various disc units are automatically returned to the desired position of alignment.

It is an object of the present invention to provide automatic alignment apparatus for each of the forward and rearward disc sections to insure return of the various disc units to their proper position.

Another object of the present inventino is to provide such alignment apparatus for the forward disc section to insure that the force exerted thereon by the tractor or other motive power means urges the disc units therein to proper alignment.

Another object of the present invention is to provide automatic alignment means as characterized above for the rearward disc section for permitting the individual disc units to change their relationship, but which alignment means is operable to urge such units back to a given relative position for optimum operation.

A still further object of the present invention is to provide for the forward disc section of a disc tiller improved hitch means whereby the pulling force of the tractor is applied to such section below the pivot axis for the disc units therein to apply an upward force to such axis.

Another object of the present invention is to provide automatic alignment means as characterized above having a spreader bar which is adjustably attached to the several disc units of the forward disc section to thereby adjust the amount of upward force applied to the pivot axis therebetween from the tractor or other power means.

Another object of the present invention is to provide alignment means as characterized above having biasing means for urging the disc units of the rearward section to optimum relative position.

A still further object of the present invention is to provide double-acting spring means for urging the pivot axis for the rearward units in opposite directions so as to maintain said units aligned.

Another object of this invention is to provide alignment means for disc tillers as characterized above which are simple and inexpensive to manufacture and which are rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figures 1, 2, 3, 4:
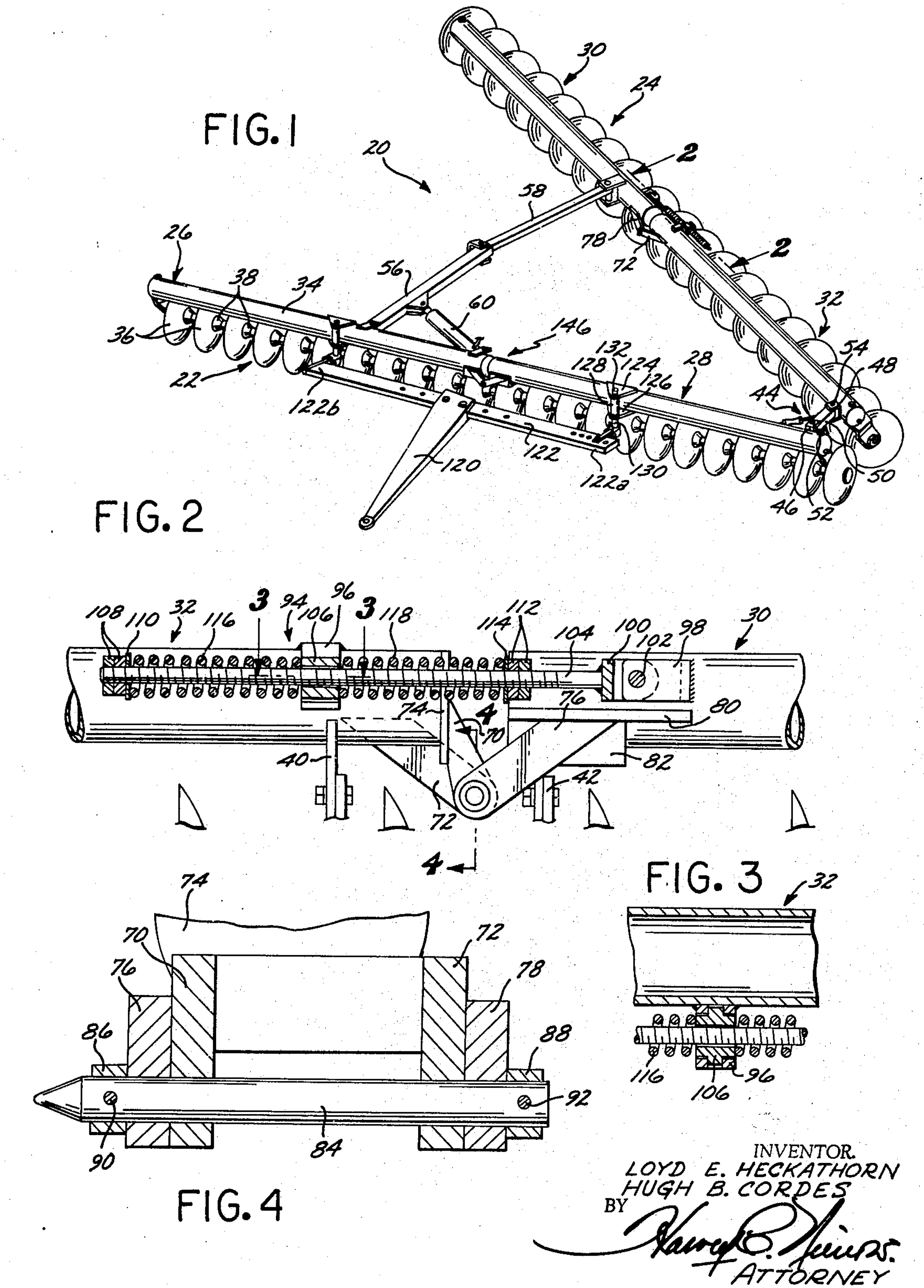
FIGURE 1 is a perspective view of a disc tiller according to the present invention.
FIGURE 2 is a fragmentary sectional view of the rearward disc section.
FIGURE 3 is a fragmentary sectional view, taken substantially along line 3—3 of FIGURE 2.
FIGURE 4 is a fragmentary sectional view, taken substantially along line 4—4 of FIGURE 2.

Referring to FIGURE 1 of the drawings, there is shown therein a disc tiller 20 comprising a forward disc section or gang 22 and a rearward disc section or gang 24. Each such section comprises a pair of disc units, as shown at 26 and 28 with respect to the forward section and at 30 and 32 with respect to the rearward section. Since all of these disc units are similar or identical in construction, only unit 26 will be described in detail.

As shown in said FIGURE 1, the disc unit 26 comprises a tubular frame member 34 to which is attached in depending relation a plurality of discs 36. Each such disc is positioned on a shaft, and spacers 38 are provided between the discs to locate the same in the desired spaced relation.

Each disc 36 is generally cup-shaped to turn over the ground as it is pulled therethrough as will hereinafter become more apparent. Each such disc is also formed with a central through opening for receiving the aforementioned mounting shaft. The shaft, of course, is secured relative to and beneath the frame member 34 by means of appropriate brackets such as shown at 40 and 42 in FIGURE 2 with respect to disc units 30 and 32.

Disc units 26 and 28 cooperate to provide the aforementioned forward disc section 22 and the units 30 and 32 cooperate to provide the rearward section 24. The two sections are pivotally connected together to be actuated from closed position, wherein the sections are adjacent each other, to the open position shown in FIGURE 1.

Pivotal interconnecting means 44 is provided comprising a pair of clevises 46 and 48 connected respectively to the disc units 28 and 32 as shown. Such means further comprises a bar 50 and suitable pivot pins 52 and 54 assembled as shown to enable the two sections to pivot with respect to each other.

Suitable hydraulic operating means is provided for effecting such relative movement of the disc sections. A forward control arm 56 is connected at one end to the frame member 34 of disc unit 26. The other end of arm 56 is connected to one end of a rearward control arm 58, the other end of the latter being pivotally connected to the frame member of disc unit 30. Thus, a collapsible connection is afforded between the disc sections, spaced from the pivotal interconnecting means 44.

A hydraulic actuator having a cylinder 60, one end of which is attached to the frame member 34 of disc unit 26, and a piston rod 62 connected to a tab 64 on control arm 56 is provided for actuating the tiller between its several positions. Piston rod 62 is pivotally connected to tab 64 by a pivot pin 66 and cylinder 60 is pivotally connected to frame member 34 by pivot pin 68.

The disc units of each of the forward and rearward sections are pivotally connected together to enable the sections or gangs to generally conform to the contour of the land or ground over which the tiller is to be pulled, and to compensate for objects such as rocks, stumps and the like which might be encountered in discing a given area. However, it has been found desirable not to permit the disc units to freely assume any haphazard position, but rather there is an optimum position for providing the best discing operation. As such, the disc units should be returned to such optimum position.

The hinge means between the several disc units is formed to provide a transverse pivot axis offset from the respective tubular frame members. Such means is shown in FIGURE 2 as comprising a pair of straps 70 and 72 firmly welded to the frame member of unit 32 in depending and horizontally offset relation thereto. That is, each such strap 70 and 72 extends downwardly from the respective frame member and is extended horizontally therefrom as shown most clearly in FIGURE 2 of the drawings. The hinge strap 72 is welded to the side of the frame, whereas strap 70 is welded to an end plate 74, which is firmly secured to the end of such frame member.

Hinge straps 76 and 78 are welded firmly to the frame member of disc unit 30 in depending and horizontally offset relation so as to provide a portion adjacent the aforementioned straps connected to the frame of disc unit 32. The strap 76 is shown connected to a pair of mounting plates 80 and 82.

As shown most clearly in FIGURE 4 of the drawings, each of the adjacent portions of straps 70, 72, 76 and 78 is formed with a through opening to provide four aligned openings for receiving a pivot pin 84 to effect the transverse pivot axis which axis is offset from the axes of the respective frame members. Suitable locking members 86 and 88 and pins 90 and 92 are provided for retaining the units in assembled relation.

Secured to the substantially aligned frame members of the disc units 30 and 32 so as to be generally spaced from the transverse pivot axis afforded by pin 84 is force-absorbing means 94. Such means comprises an abutment 96 firmly secured to the frame member of unit 32 and an abutment member 98 secured to the frame of unit 30. A clevis 100 is pivotally connected to abutment 98 by a pin 102 and carries a threaded shaft 104. One end of shaft 104 is firmly welded to clevis 100. The central portion of shaft 104 is slidably positioned within a sleeve 106 which is nonrotatably anchored within a through opening in the abutment 96.

Any appropriate shoulder means such as fastening nuts 108 and washer 110 is provided on the free end of shaft 104 as shown. Similar shoulder means such as fastening nuts 112 and washer 114 is provided between abutments 96 and 98 on shaft 104 as shown in FIGURE 2.

A compression spring 116 is interposed between the abutment 96 and shoulder means including nuts 108 and washer 110. In like manner, a compression spring 118 is operatively interposed between abutment 96 and the shoulder means including nuts 112 and washer 114.

The above arrangement for pivotally interconnecting the disc units 30 and 32 causes the compression springs 116 and 118 to urge such units to predetermined aligned relation whenever external forces cause pivotal relative movement of such units in either direction about pin 84. That is, in the event the adjacent end portions of the disc units 30 and 32 drop or move downwardly while the opposite end portions thereof remain at a high elevation, the compression spring 118 is compressed further. This results, of course, due to the fact that the pivot axis between such units is offset below the frame members and the axis of operation of spring 118. This causes the shoulder means afforded by nuts 112 and washer 114 to move toward abutment 96 thereby compressing spring 118.

Due to the non-linear spring rate of a compression spring as shown at 118, the more it is compressed the greater is the force generated therein. Ultimately, further compression of such spring is prevented, and when the external forces on the several disc units are removed such force generated in spring 118 returns the disc units to their predetermined aligned relation.

In like manner, when the adjacent end portions of the disc units 30 and 32 are raised, the shoulder means afforded by nuts 108 and washer 110 approach the abutment 96. This compresses spring 116 thereby generating a force therein for limiting such relative movement of the disc units, and for returning the disc units to their predetermined aligned relation.

By adjusting the position of nuts 108 and nuts 112 on shaft 104 the relative position of alignment of the several disc units can be altered as desired.

Figure 5:
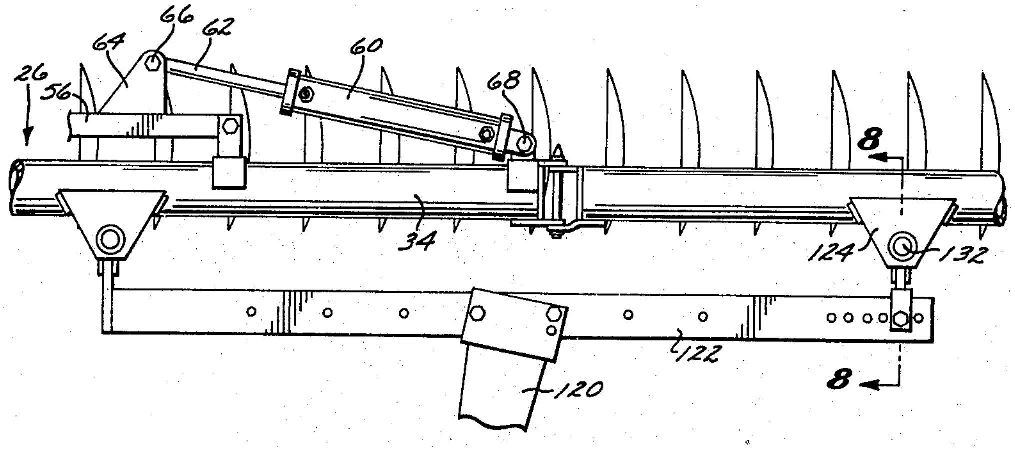
FIGURE 5 is a fragmentary top plan view of the forward disc section of the disc tiller shown in FIGURE 1.

As shown most particularly in FIGURES 1 and 5 of the drawings, the forward gang or section of disc units is attached to suitable tractive means (not shown) through a draw bar 120. One end of draw bar 120 is attached to the central portion of a spreader bar 122. As shown most clearly in FIGURE 5 of the drawings, such members are attached at a slight angle so as to dispose the forward gang of disc units in proper relation to the direction of movement of the entire disc tiller, as is well understood in the art.

One end **122*a* of spreader bar 122 is connected to the frame member of disc unit 28. A pair of spaced bracket members 124 and 126 are welded to the top and bottom respectively of such frame member. A sleeve 128 is welded to and between such bracket members in alignment with suitable through openings formed in the latter. A pull bar 130 is then vertically disposed within such sleeve and openings and a fastening pin 132** is positioned in aligned openings in such bar and sleeve to retain the former in assembled relation.

The lower end portion of pull bar 130 is provided with pull bar connector means in the form of a rotatably mounted clevis 134. Such clevis is prevented from vertical movement on pull bar 130 by collars 136 and 138. A connector member 140 is pivotally connected to clevis 134 by a pivot pin 142, and is bifurcated to provide upper and lower arms on either side of spreader bar 122. A fastening bolt 144 extends through suitable aligned openings in such arms and spreader bar to firmly retain the same in assembled relation.

The connection means for the other end **122*a* of spreader bar 122 is similar to that described above. However, the end portion 122*b* is adjustably connected to the disc unit 28, whereas the end portion 122*a* is connected to unit 26** is a predetermined manner.

The disc units 26 and 28 are connected together at their adjacent end portions by suitable pivot means 146 as above described with respect to the pivot means associated with disc units 30 and 32. That is, the pivot means 146 comprises suitable straps welded to the respective frame members in depending and horizontally offset relation, and a pivot pin within suitable openings to thereby provide a pivot axis for the units 26 and 28 which is offset below the corresponding frame members.

Figure 6:
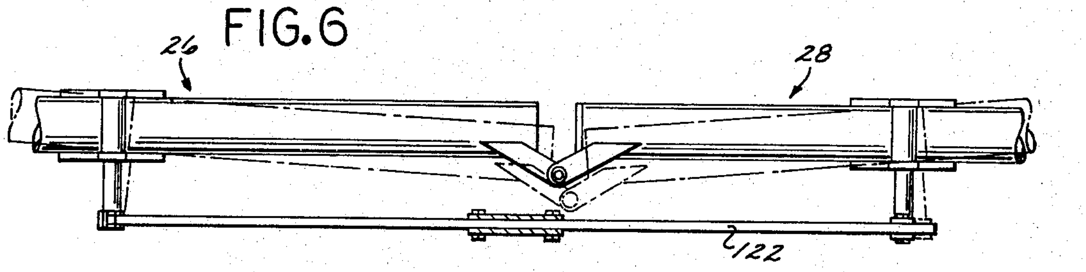
FIGURE 6 is a fragmentary front elevational view thereof, shown partly in section.
Figure 7:
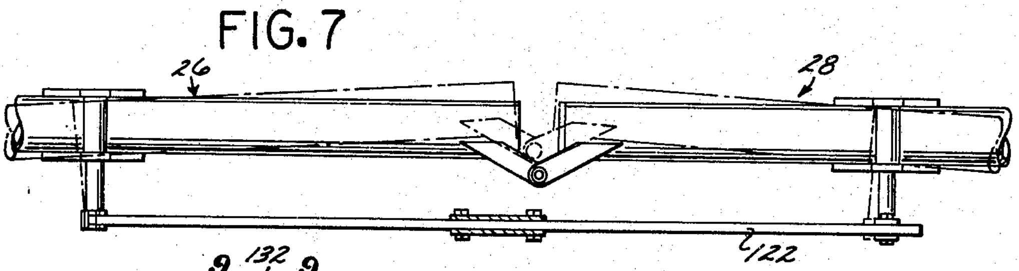
FIGURE 7 is a view similar to FIGURE 6, showing the frame members in different relative positions.
Figure 8:
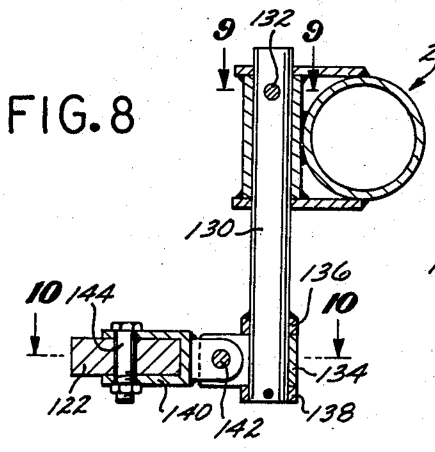
FIGURE 8 is a vertical sectional view, taken substantially along line 8—8 of FIGURE 5.
Figure 9:
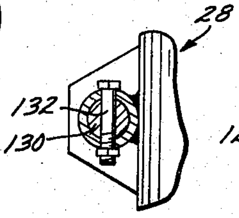
FIGURE 9 is a horizontal sectional view, taken substantially along line 9—9 of FIGURE 8.
Figure 10:
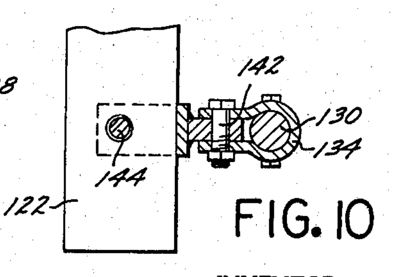
FIGURE 10 is a horizontal sectional view, taken substantially along line 10—10 of FIGURE 8.

It will be noted from FIGURES 6 and 7 that the spreader bar 122 is connected to the respective pull bars at a lower elevation than the position of the pivot axis for the units 26 and 28.

In operation, after the hydraulic cylinder 60 has been suitably energized to open the disc tiller 20, and the draw bar 120 has been connected to the tractor or other motive power tractive means, the tiller is in position to be pulled over the ground. Heretofore, such forward pulling force has had a marked effect on the relative position of the disc units of the forward gang or section. With the present invention, however, it is a simple matter to reposition the interconnecting means including pull bar 130 in the end portion **122*b* of spreader bar 122. That is, due to the fact that the spreader bar is connected to the forward disc units below the pivot axis therefor, if the tendency is for the adjacent end portions of the units 26 and 28 to move upwardly, it is a simple matter to reposition the connector means in one of the openings at end 122*b* of spreader bar 122** closer to the center of the spreader bar. This will have the effect of pulling the disc units together, causing the adjacent end portions of the disc units to be returned to the desired position.

Conversely, if the adjacent end portions of the disc units 26 and 28 tend to move downwardly, the connectors are too close together on the spreader bar, thus requiring the connector at the end portion **122*b*** to be moved toward the end of the spreader bar.

It is thus seen that the present invention teaches the construction and operation of means for automatically controlling the alignment of the disc units in both the forward and rearward disc sections or gangs of a disc tiller.

Although we have shown and described certain specific embodiments of our invention, we are fully aware that many modifications thereof are possible.

We claim:

1. Automatic alignment apparatus for a disc tiller having a plurality of disc units movable relative to each other, comprising in combination, hinge means connected to said disc units to enable them to pivot relative to each other about a horizontal pivot axis in either of two opposite directions from optimum relative operating position, and resilient force-absorbing means operable upon relative movement of said disc units in either of said opposite directions comprising a shaft having one end pivotally attached to one of said disc units, an abutment fixed to the other of said disc units and formed with a through opening receiving said shaft, a pair of shoulder members adjustably mounted on said shaft on opposite sides of and spaced from said abutment, and two substantially similar compression springs each of which is interposed between said abutment and a separate one of said shoulder members to be operable alternatively to urge said disc units to said optimum relative operating position with like force irrespective of the direction of pivotal movement.

2. Automatic alignment apparatus for a disc tiller according to claim 1, wherein said shoulder members are independently adjustable along said shaft to permit of equalizing the forces of said compression springs in returning said disc units to optimum relative operating position.

3. Automatic alignment apparatus for a disc tiller according to claim 1, wherein said abutment is formed with a sleeve having a through opening receiving said shaft, said sleeve being made of abrasive resistant material for minimization of wear due to movement of said shaft.

4. Automatic alignment apparatus for a disc tiller according to claim 1, wherein said pivot axis is spaced from said disc units so that relative pivotal movement of said disc units causes relative longitudinal movement thereof, and said shaft and disc units are substantially coplanar within a horizontal plane so that relative pivotal movement of said disc units causes said shaft and shoulder members to move relative to said abutment.

References Cited

UNITED STATES PATENTS

| | | | |
|---|---|---|---|
| 836,773 | 11/1906 | Moore | 172—679 X |
| 2,167,768 | 8/1939 | Mitchell | 172—679 X |
| 2,604,746 | 7/1952 | Frank et al. | 172—597 X |
| 2,610,454 | 9/1952 | Oehler et al. | 172—572 |
| 2,970,656 | 2/1961 | Kampe | 172—619 X |

ROBERT E. BAGWILL, Primary Examiner

S. C. PELLEGRINO, Assistant Examiner

U.S. Cl. X.R.

16—190; 172—597. 679